United States Patent [19]
Goto et al.

[11] Patent Number: 4,708,443
[45] Date of Patent: Nov. 24, 1987

[54] ZOOM LENS SYSTEM

[75] Inventors: Hisashi Goto; Yasuji Ogata, both of Tokyo, Japan

[73] Assignee: Olympus Optical Co., Ltd., Tokyo, Japan

[21] Appl. No.: 860,179

[22] Filed: May 6, 1986

[30] Foreign Application Priority Data

May 15, 1985 [JP] Japan .................................. 60-101528

[51] Int. Cl.⁴ .............................................. G02B 15/16
[52] U.S. Cl. ..................................................... 350/427
[58] Field of Search .................................. 350/427, 423

[56] References Cited

U.S. PATENT DOCUMENTS 4,632,519 12/1986 Takahashi ............................ 350/427

FOREIGN PATENT DOCUMENTS

58-127908 7/1983 Japan .

Primary Examiner—John K. Corbin
Assistant Examiner—Rebecca D. Gass
Attorney, Agent, or Firm—Cushman, Darby & Cushman

[57] ABSTRACT

A zoom lens system comprising a first lens group having positive refractive power and having a focusing function, a second lens group having negative refractive power and having a vari-focal function, a third lens group having positive refractive power and having a vari-focal function, and a fourth lens group having positive refractive power and having a vari-focal function, wherein the second lens group comprises a negative lens having a surface with strong curvature on the image side, a cemented doublet consisting of a negative lens and a positive lens, a negative lens having a surface with strong curvature on the object side, and a positive meniscus lens having a surface with strong curvature on the object side, the zoom lens system having a large vari-focal ratio and a large aperture ratio and arranged compactly.

5 Claims, 10 Drawing Figures

ZOOM LENS SYSTEM

BACKGROUND OF THE INVENTION (a) Field of the Invention

The present invention relates to a zoom lens system.

(b) Description of the Prior Art

In recent years, zoom lens systems are in great demand in the field of photographic lens systems and the like because they are excellent in portability, convenience in operation, etc. Especially, there is an increasing demand for zoom lens systems with ranges of field angle which include 47°, i.e., the field angle of standard lens systems. Furthermore, among zoom lens systems with large zoom ratios, zoom lens systems having a large zooming range in the telephoto range are especially demanded for.

To meet the above-mentioned demand, the zoom lens system disclosed in Japanese published unexamined patent application No. 127908/83 is known as a zoom lens system for photographic cameras which has the range of field angle including 47° and zoom ratio exceeding 3.4. Said known zoom lens system comprises a first lens group having positive refractive power, a second lens group having negative refractive power, a third lens group having positive refractive power and a fourth lens group having positive refractive power, and it conparatively resembles the zoom lens system according to the present invention.

In cases of zoom lens systems which comprise a first lens group having positive refractive power, a second lens group having negative refractive power, a third lens group having positive refractive power and a fourth lens group having positive refractive power like the zoom lens system according to the present invention, the second lens group which is the only lens group having negative refractive power and which functions as the variator has very strong refractive power in most cases. Therefore, from the view point of correction of aberrations, there is a tendency that the number of lenses constituting said second lens group is made large and, consequently, the overall length of the lens system becomes long. The above-mentioned point is one of obstructing factors when it is intended to arrange a zoom lens system as a whole compactly.

The above-mentioned tendency is conspicuous in cases of zoom lens systems of such type that the second lens group is kept fixed. For the above-mentioned type of zoom lens systems, it is possible to make the optical performance stable and to simplify the structure of lens mount because the second lens group having strong refractive power does not move and, therefore, there occur very few factors such as eccentricity etc. that make the imaging performance unfavourable. However, when the second lens group is long as described in the above, the distance between the first and second lens groups becomes long in the wide position and the distance between the second and third lens groups becomes long in the teleposition. As a result, the lens system as a whole tends to become large.

Besides, when the second lens group is long, it is difficult to make the distance between the principal point of the second lens group and the principal point of the third lens group satisfactorily short, and the airspace required for moving the lens groups for the purpose of variation of the focal length tends to become large. The above-mentioned problem also prevents zoom lens systems from being arranged compactly.

SUMMARY OF THE INVENTION

It is, therefore, a primary object of the present invention to provide a zoom lens system with a large vari-focal ratio, i.e., the smallest field angle smaller than 19° and the largest field angle larger than 60°, said zoom lens system as a whole being arranged compactly by making the overall length of the second lens group thereof short and adjusting the position of the principal point thereof.

The zoom lens system according to the present invention comprises a first lens group having positive refractive power and having a focusing function, a second lens group having negative refractive power and having a vari-focal function, a third lens group having positive refractive power and having a vari-focal function, and a fourth lens group having positive refractive power and having a vari-focal function.

To compactly arrange a zoom lens system in which only the second lens group has negative refractive power as described in the above and of which the range of field angle includes 47° and zoom ratio is larger than 3.4, it is necessary to make the overall length of the second lens group short by giving sufficient refractive power to the second lens group and to put the rear principal point of the second lens group close to the image. For this purpose, the zoom lens system according to the present invention is arranged that the second lens group comprises, in the order from the object side, a negative lens having a surface with strong curvature on the image side, a cemented doublet consisting of a negative lens and a positive lens, a negative lens having a surface with strong curvature on the object side, and a positive meniscus lens having a surface with strong curvature on the object side. By arranging the second lens group as described in the above, distortion in the wide position is corrected by means of the negative lens located in the foremost position in the second lens group, and chromatic aberration is corrected by means of the cemented doublet consisting of a negative lens and a positive lens. Moreover, it is preferable to make the negative action of the air lens to be formed between the negative lens and the cemented doublet strong by forming the surface on the object side of the cemented doublet as a concave surface so as to thereby make the focal length of the second lens group short in the state that aberrations are prevented from occurring and the second lens group is kept compact.

Besides, to make the variation of spherical aberration among respective states of zooming small and to keep spherical aberration favourable, a lens component with positive refractive power is required in the second lens group. By using a meniscus lens having a surface with strong curvature on the object side as said lens component with positive refractive power, it is possible to make the variation of offaxial rays among respective states of zooming small. To make the effect thereof large, it is preferable to arrange a positive lens component (positive meniscus lens) in the rearmost position in the second lens group. That is, in the second lens group, offaxial rays pass positions comparatively distant from the optical axis. Therefore, to eliminate the variation of aberrations, it is preferable to arrange that offaxial rays, which come out from the second lens group, will come out from a lens which is concentric with a stop located in rear of the second lens group. Therefore, it is preferable to arrange said positive lens component as a positive meniscus lens having a surface on the object side with a small radius of curvature. By arranging as described in the above, it is possible to make the airspace between said positive lens component and the negative lens component located on the object side thereof small and, moreover, it is possible to make the distance between the position of the rear principal point of the second lens group and the position of the front principal point of the third lens group small in the teleposition. Thus, it is possible to increase the vari-focal effect.

By arranging that the second lens group has the lens composition as described in the above, it is possible to make the overall length of the second lens group short at the same time as arranging that the second lens group has sufficient refractive power. Besides, by arranging as above, it is possible to make the distance between the second and first lens groups in the wide position short and to make the distance between the second and third lens groups in the teleposition short. As a result, it is possible to obtain a compact zoom lens system with aberrations corrected favourably.

The zoom lens system according to the present invention is arranged to have the lens composition as described so far and, at the same time, to fulfill the conditions shown below:

(1) $1.6 < f_1/f_W < 2.0$
(2) $0.4 < |f_2|/f_W < 0.6$
(3) $2.1 < \beta_{2T}/\beta_{2W} < 2.4$
(4) $1.5 < \beta_{3T}\beta_{4T}/\beta_{3W}\beta_{4W} < 1.7$ where, reference symbols $f_1$ and $f_2$ respectively represent focal length of the first and second lens groups, reference symbols $f_W$ represents the focal length of the lens system as a whole in the wide position, reference symbols $\beta_{2T}$ and $\beta_{2W}$ respectively represent magnifications of the second lens group in the teleposition and wide position, reference symbols $\beta_{3T}$ and $\beta_{3W}$ respectively represent magnifications of the third lens group in the teleposition and wide position, and reference symbols $\beta_{4T}$ and $\beta_{4W}$ respectively represent magnifications of the fourth lens group in the teleposition and wide position.

If, in the condition (1), $f_1/f_W$ is made larger than the upper limit thereof, i.e., 2.0, the distance between the first and second lens groups becomes too long, and it is impossible to make the lens system compact. If $f_1/f_W$ is made smaller than the lower limit thereof, i.e., 1.6, aberrations to be caused by the first lens group become too large, and it is impossible to correct them by the other lens groups.

If $|f_2|/f_W$ defined by the condition (2) is made larger than 0.6, large spaces are required in front and rear of the second lens group when it is intended to ensure the value of contribution to zooming which is alloted to the second lens group and which is defined by the condition (3), and it is undesirable for making the lens system compact. If $|f_2|/f_W$ defined by the condition (2) is made smaller than 0.4, aberrations to be caused by the second lens group become too large.

The conditions (3) and (4) are established in order to define the values of contribution to zooming which are to be alloted to respective lens groups in the vari-focal system.

If $\beta_{2T}/\beta_{2W}$ defined by the condition (3) is made smaller than 2.1, the values of contribution to zooming which are to be alloted to the third and fourth lens groups should be made large and, consequently, aberrations to be caused by the third and fourth lens groups increase.

The condition (4) is established due to the same reason as the condition (3). If $\beta_{3T}\beta_{4T}/\beta_{3W}\beta_{4W}$ is made smaller than the lower limit of the condition (4), the value of contribution to zooming which is to be alloted to the second lens group should be made large and, consequently, aberrations to be caused by the second lens group increases. If $\beta_{3T}\beta_{4T}/\beta_{3W}\beta_{4W}$ is made larger than the upper limit of the condition (4), aberrations to be caused by the third and fourth lens groups become large.

In addition to the conditions (1) through (4) described in the above, it is more preferable to arrange that the zoom lens system according to the present invention further fulfills the conditions (5) through (8) shown below:

(5) $1 < r_{2\text{-}2}/-f_2 < 1.1$
(6) $12 < r_{2\text{-}3}/f_2 < 22$
(7) $0.48 < r_{2\text{-}8}/r_{2\text{-}9} < 0.58$
(8) $\nu_{2\text{-}2} - \nu_{2\text{-}3} > 15$ where, reference symbol $r_{2\text{-}i}$ represents the radius of curvature of ith surface in the second lens group, and reference symbol $\nu_{2\text{-}i}$ represents Abbe's number of ith lens in the second lens group.

If $r_{2\text{-}2}/-f_2$ defined by the condition (5) is made larger than 1.1, negative distortion to be caused at the second surface in the second lens group becomes large in the wide position, and it is impossible to correct said negative distortion by means of the other lenses constituting the second lens group. If $r_{2\text{-}2}/-f_2$ is made smaller than 1, coma flare becomes large in the teleposition.

If $r_{2\text{-}3}/f_2$ defined by the condition (6) is made larger than 22, the negative action of the air lens to be formed between the first lens component (negative lens having a surface with strong curvature on the image side) in the second lens group and the second lens component (cemented doublet) in the second lens group becomes too large, and it is necessary to make refractive powers of the other negative lenses in the second lens group stronger. As a result, it is impossible to keep aberrations favourable. If $r_{2\text{-}3}/f_2$ is made smaller than 12, the airspace between the first and second lens components in the second lens group should be made large, and it is impossible to make the lens system compact.

If $r_{2\text{-}8}/r_{2\text{-}9}$ defined by the condition (7) is made larger than 0.58, spherical aberration becomes unfavourable. If $r_{2\text{-}8}/r_{2\text{-}9}$ becomes smaller than 0.48, it is impossible to correct coma.

As the second lens group has strong negative refractive power, it tends to cause both of lateral chromatic aberration and longitudinal chromatic aberration. The condition (8) is established in order to correct said chromatic aberrations favourably. If the condition (8) is not fulfilled, chromatic aberrations caused by the second lens group cannot be satisfactorily corrected by means of the other lens groups.

DETAILED DESCRIPTION OF THE PREFERRED EMBODIMENTS

Figure 1:
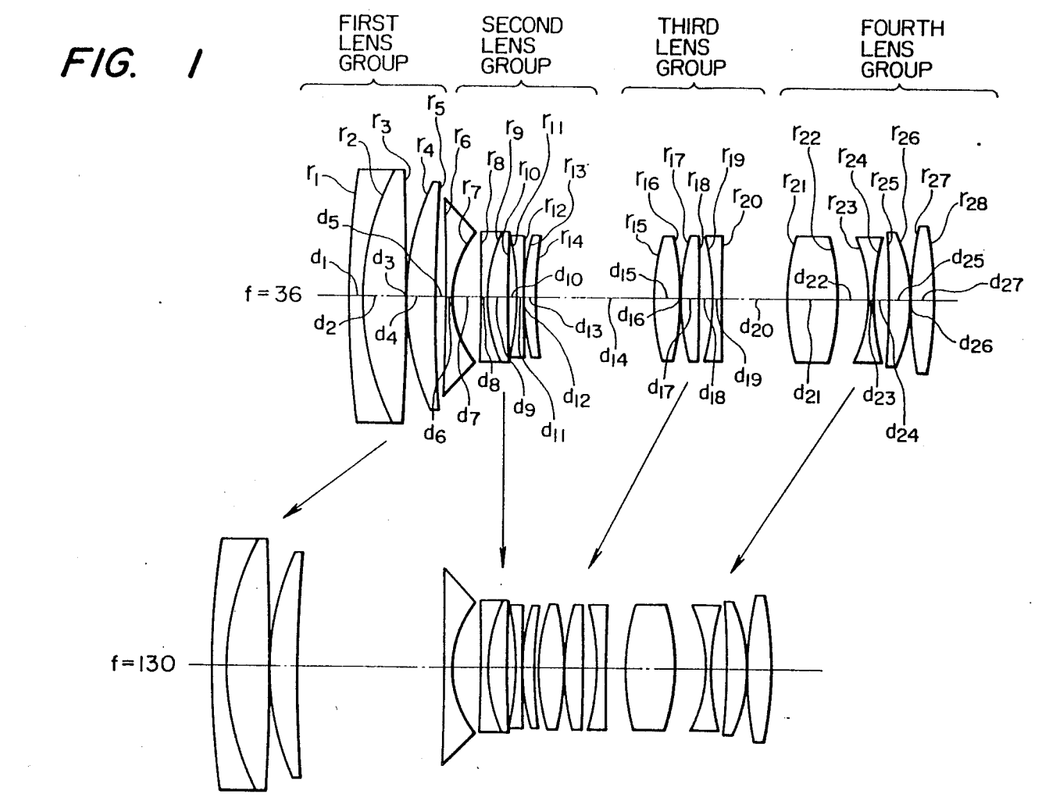
FIG. 1 shows a sectional view of the zoom lens system according to the present invention.

The zoom lens system according to the present invention has the lens configuration as shown in FIG. 1. That is, in the zoom lens system according to the present invention, the first lens group comprises a cemented doublet, which consists of a negative lens element and a positive lens element, and a positive lens component, the second lens group comprises a negative lens component, a cemented doublet which consists of a negative lens element and a positive lens element, a negative lens component, and a positive meniscus lens component as described already, the third lens group comprises a positive lens component, a positive lens component, and a negative lens component, and the fourth lens group comprises a positive lens component, a negative lens component, a positive lens component, and a positive lens component, the zoom lens system according to the present invention being arranged to be zoomed by moving the lens groups as shown by arrow marks in FIG. 1.

Preferred embodiments of the zoom lens system according to the present invention are as shown below.

| Embodiment 1 | | | |
|---|---|---|---|
| $f = 36 \sim 85 \sim 130$ | | | |
| $r_1 = 139.9220$ | | | |
| $d_1 = 2.3000$ | $n_1 = 1.80518$ | | $\nu_1 = 25.43$ |
| $r_2 = 45.3700$ | | | |
| $d_2 = 7.1000$ | $n_2 = 1.54771$ | | $\nu_2 = 62.83$ |
| $r_3 = -519.0230$ | | | |
| $d_3 = 0.1000$ | | | |
| $r_4 = 46.2310$ | | | |
| $d_4 = 4.7000$ | $n_3 = 1.78800$ | | $\nu_3 = 47.38$ |
| $r_5 = 310.0150$ | | | |
| $d_5 = D_1$ | | | |
| $r_6 = -900.8200$ | | | |
| $d_6 = 1.1000$ | $n_4 = 1.72916$ | | $\nu_4 = 54.68$ |
| $r_7 = 17.6420$ | | | |
| $d_7 = 4.8300$ | | | |
| $r_8 = -244.7750$ | | | |
| $d_8 = 1.1000$ | $n_5 = 1.77250$ | | $\nu_5 = 49.66$ |
| $r_9 = 28.0590$ | | | |
| $d_9 = 3.2600$ | $n_6 = 1.80518$ | | $\nu_6 = 25.43$ |
| $r_{10} = 453.8410$ | | | |
| $d_{10} = 1.5300$ | | | |
| $r_{11} = -44.1060$ | | | |
| $d_{11} = 1.0000$ | $n_7 = 1.72916$ | | $\nu_7 = 54.68$ |
| $r_{12} = 221.4440$ | | | |
| $d_{12} = 0.1000$ | | | |
| $r_{13} = 36.5760$ | | | |
| $d_{13} = 1.8900$ | $n_8 = 1.84666$ | | $\nu_8 = 23.78$ |
| $r_{14} = 69.4260$ | | | |
| $d_{14} = D_2$ | | | |
| $r_{15} = 37.3020$ | | | |
| $d_{15} = 4.3000$ | $n_9 = 1.55963$ | | $\nu_9 = 61.17$ |
| $r_{16} = -45.0030$ | | | |
| $d_{16} = 0.1000$ | | | |
| $r_{17} = 41.3560$ | | | |
| $d_{17} = 3.0100$ | $n_{10} = 1.53172$ | | $\nu_{10} = 48.90$ |
| $r_{18} = -212.4540$ | | | |
| $d_{18} = 2.3100$ | | | |
| $r_{19} = -37.0760$ | | | |
| $d_{19} = 1.3900$ | $n_{11} = 1.80518$ | | $\nu_{11} = 25.43$ |
| $r_{20} = 778.4640$ | | | |
| $d_{20} = D_3$ | | | |
| $r_{21} = 39.7800$ | | | |
| $d_{21} = 8.2100$ | $n_{12} = 1.55963$ | | $\nu_{12} = 61.17$ |
| $r_{22} = -36.5970$ | | | |
| $d_{22} = 5.0600$ | | | |
| $r_{23} = -24.3140$ | | | |
| $d_{23} = 1.0000$ | $n_{13} = 1.80440$ | | $\nu_{13} = 39.58$ |
| $r_{24} = 41.6540$ | | | |

| -continued | | | |
|---|---|---|---|
| Embodiment 1 | | | |
| $d_{24} = 2.4000$ | | | |
| $r_{25} = -114.3040$ | | | |
| $d_{25} = 3.4600$ | $n_{14} = 1.57501$ | | $\nu_{14} = 41.49$ |
| $r_{26} = -28.0590$ | | | |
| $d_{26} = 0.1000$ | | | |
| $r_{27} = 63.4780$ | | | |
| $d_{27} = 3.6800$ | $n_{15} = 1.51633$ | | $\nu_{15} = 64.15$ |
| $r_{28} = -69.6940$ | | | |

| f | 36 | 85 | 130 |
|---|---|---|---|
| $D_1$ | 1.500 | 17.510 | 23.800 |
| $D_2$ | 19.710 | 7.180 | 0.800 |
| $D_3$ | 8.990 | 2.790 | 1.650 |

$f_1/f_W = 1.76$, $f_2/f_W = -0.466$
$\beta_{2T}/\beta_{2W} = 2.296$, $\beta_{3T}\beta_{4T}/\beta_{3W}\beta_{4W} = 1.565$
$|\nu_{2-2} - \nu_{2-3}| = 23.57$, $r_{2-2}/-f_2 = 1.045$
$r_{2-3}/f_2 = 14.506$, $r_{2-8}/r_{2-9} = 0.527$

| Embodiment 2 | | | |
|---|---|---|---|
| $f = 36 \sim 85 \sim 130$ | | | |
| $r_1 = 154.8968$ | | | |
| $d_1 = 2.3000$ | $n_1 = 1.80518$ | | $\nu_1 = 25.43$ |
| $r_2 = 45.3135$ | | | |
| $d_2 = 7.1001$ | $n_2 = 1.54771$ | | $\nu_2 = 62.83$ |
| $r_3 = -381.2565$ | | | |
| $d_3 = 0.1000$ | | | |
| $r_4 = 46.6902$ | | | |
| $d_4 = 4.5998$ | $n_3 = 1.78800$ | | $\nu_3 = 47.38$ |
| $r_5 = 363.8236$ | | | |
| $d_5 = D_1$ | | | |
| $r_6 = -693.0691$ | | | |
| $d_6 = 1.1000$ | $n_4 = 1.72916$ | | $\nu_4 = 54.68$ |
| $r_7 = 18.0061$ | | | |
| $d_7 = 4.7005$ | | | |
| $r_8 = -330.8092$ | | | |
| $d_8 = 1.1000$ | $n_5 = 1.77250$ | | $\nu_5 = 49.66$ |
| $r_9 = 25.9091$ | | | |
| $d_9 = 3.3900$ | $n_6 = 1.80518$ | | $\nu_6 = 25.43$ |
| $r_{10} = 574.5947$ | | | |
| $d_{10} = 1.5302$ | | | |
| $r_{11} = -43.2765$ | | | |
| $d_{11} = 1.0000$ | $n_7 = 1.72916$ | | $\nu_7 = 54.68$ |
| $r_{12} = 185.5786$ | | | |
| $d_{12} = 0.1000$ | | | |
| $r_{13} = 36.8904$ | | | |
| $d_{13} = 1.8900$ | $n_8 = 1.84666$ | | $\nu_8 = 23.78$ |
| $r_{14} = 70.9466$ | | | |
| $d_{14} = D_2$ | | | |
| $r_{15} = 38.3037$ | | | |
| $d_{15} = 4.3000$ | $n_9 = 1.55963$ | | $\nu_9 = 61.17$ |
| $r_{16} = -42.3613$ | | | |
| $d_{16} = 0.1000$ | | | |
| $r_{17} = 41.0704$ | | | |
| $d_{17} = 3.0405$ | $n_{10} = 1.53172$ | | $\nu_{10} = 48.90$ |
| $r_{18} = -487.5034$ | | | |
| $d_{18} = 2.1065$ | | | |
| $r_{19} = -36.8331$ | | | |
| $d_{19} = 1.4188$ | $n_{11} = 1.80518$ | | $\nu_{11} = 25.43$ |
| $r_{20} = 482.0025$ | | | |
| $d_{20} = D_3$ | | | |
| $r_{21} = 36.8102$ | | | |
| $d_{21} = 8.3360$ | $n_{12} = 1.55963$ | | $\nu_{12} = 61.17$ |
| $r_{22} = -36.2265$ | | | |
| $d_{22} = 5.0639$ | | | |
| $r_{23} = -24.6299$ | | | |
| $d_{23} = 1.0000$ | $n_{13} = 1.80440$ | | $\nu_{13} = 39.58$ |
| $r_{24} = 41.1204$ | | | |
| $d_{24} = 2.4000$ | | | |
| $r_{25} = -208.0241$ | | | |
| $d_{25} = 3.2891$ | $n_{14} = 1.57501$ | | $\nu_{14} = 41.49$ |
| $r_{26} = -29.3027$ | | | |
| $d_{26} = 0.1000$ | | | |
| $r_{27} = 71.3475$ | | | |
| $d_{27} = 3.4825$ | $n_{15} = 1.51633$ | | $\nu_{15} = 64.15$ |
| $r_{28} = -74.5180$ | | | |

| f | 36 | 85 | 130 |
|---|---|---|---|

-continued

| Embodiment 2 | | | |
|---|---|---|---|
| $D_1$ | 1.5 | 17.26 | 23.51 |
| $D_2$ | 20.19 | 7.36 | 0.8 |
| $D_3$ | 10.56 | 4.91 | 3.92 |

$f_1/f_W = 1.76$, $f_2/f_W = 0.475$
$\beta_{2T}/\beta_{2W} = 2.276$, $\beta_{3T}\beta_{4T}/\beta_{3W}\beta_{4W} = 1.582$
$|\nu_{2-2} - \nu_{2-3}| = 23.57$, $r_{2-2}/-f = 1.0477$
$r_{2-3}/f_2 = 19.249$, $r_{2-8}/r_{2-9} = 0.512$

| Embodiment 3 | | | |
|---|---|---|---|
| $f = 36 \sim 85 \sim 130$ | | | |
| $r_1 = 181.2737$ | | | |
| $d_1 = 2.3100$ | $n_1 = 1.80518$ | | $\nu_1 = 25.43$ |
| $r_2 = 45.4961$ | | | |
| $d_2 = 7.0500$ | $n_2 = 1.54771$ | | $\nu_2 = 62.83$ |
| $r_3 = -369.7884$ | | | |
| $d_3 = 0.1000$ | | | |
| $r_4 = 47.6507$ | | | |
| $d_4 = 4.5900$ | $n_3 = 1.78590$ | | $\nu_3 = 44.18$ |
| $r_5 = 423.1766$ | | | |
| $d_5 = D_1$ | | | |
| $r_6 = -829.0248$ | | | |
| $d_6 = 1.3500$ | $n_4 = 1.72916$ | | $\nu_4 = 54.68$ |
| $r_7 = 18.2024$ | | | |
| $d_7 = 4.4501$ | | | |
| $r_8 = -315.9500$ | | | |
| $d_8 = 1.1000$ | $n_5 = 1.77250$ | | $\nu_5 = 49.66$ |
| $r_9 = 26.6380$ | | | |
| $d_9 = 3.3900$ | $n_6 = 1.80518$ | | $\nu_6 = 25.43$ |
| $r_{10} = 1025.3081$ | | | |
| $d_{10} = 1.5294$ | | | |
| $r_{11} = -44.4509$ | | | |
| $d_{11} = 1.0000$ | $n_7 = 1.72916$ | | $\nu_7 = 54.68$ |
| $r_{12} = 230.7650$ | | | |
| $d_{12} = 0.1000$ | | | |
| $r_{13} = 36.3410$ | | | |
| $d_{13} = 1.8900$ | $n_8 = 1.84666$ | | $\nu_8 = 23.78$ |
| $r_{14} = 66.4838$ | | | |
| $d_{14} = D_2$ | | | |
| $r_{15} = 40.0740$ | | | |
| $d_{15} = 4.4210$ | $n_9 = 1.58913$ | | $\nu_9 = 60.97$ |
| $r_{16} = -43.6958$ | | | |
| $d_{16} = 0.1000$ | | | |
| $r_{17} = 41.0508$ | | | |
| $d_{17} = 3.1550$ | $n_{10} = 1.53172$ | | $\nu_{10} = 48.90$ |
| $r_{18} = 461.7770$ | | | |
| $d_{18} = 2.1713$ | | | |
| $r_{19} = -37.0252$ | | | |
| $d_{19} = 1.0000$ | $n_{11} = 1.80518$ | | $\nu_{11} = 25.43$ |
| $r_{20} = 496.1940$ | | | |
| $d_{20} = D_3$ | | | |
| $r_{21} = 37.7635$ | | | |
| $d_{21} = 8.5087$ | $n_{12} = 1.58913$ | | $\nu_{12} = 60.97$ |
| $r_{22} = -37.7635$ | | | |
| $d_{22} = 5.1047$ | | | |
| $r_{23} = -25.3960$ | | | |
| $d_{23} = 1.0000$ | $n_{13} = 1.80440$ | | $\nu_{13} = 39.58$ |
| $r_{24} = 41.2554$ | | | |
| $d_{24} = 2.1326$ | | | |
| $r_{25} = -242.2221$ | | | |
| $d_{25} = 3.2000$ | $n_{14} = 1.57501$ | | $\nu_{14} = 41.49$ |
| $r_{26} = -28.4950$ | | | |
| $d_{26} = 0.1000$ | | | |
| $r_{27} = 66.8990$ | | | |
| $d_{27} = 3.4825$ | $n_{15} = 1.51821$ | | $\nu_{15} = 65.04$ |
| $r_{28} = -95.2570$ | | | |

| f | 36 | 85 | 130 |
|---|---|---|---|
| $D_1$ | 1.50 | 17.859 | 24.61 |
| $D_2$ | 20.51 | 7.370 | 0.80 |
| $D_3$ | 10.67 | 4.946 | 3.90 |

$f_1/f_W = 1.84$, $f_2/f_W = -0.495$
$\beta_{2T}/\beta_{2W} = 2.23$, $\beta_{3T}\beta_{4T}/\beta_{3W}\beta_{4W} = 1.590$
$|\nu_{2-2} - \nu_{2-3}| = 24.23$, $r_{2-2}/-f_2 = 1.0143$
$r_{2-3}/f_2 = 17.55$, $r_{2-8}/r_{2-9} = 0.547$ In respective embodiments shown in the above, reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbol f represents the focal length of the lens system as a whole.

Reference symbols $r_{2-2}$, $r_{2-3}$, $r_{2-8}$ and $r_{2-9}$ used in the conditions (5) through (7) respectively correspond to reference symbols $r_7$, $r_8$, $r_{13}$ and $r_{14}$ in the numerical data of respective embodiments, and reference symbols $\nu_{2-2}$ and $\nu_{2-3}$ used in the condition (8) respectively correspond to reference symbols $\nu_5$ and $\nu_6$ in the numerical data of respective embodiments.

Figure 2A:
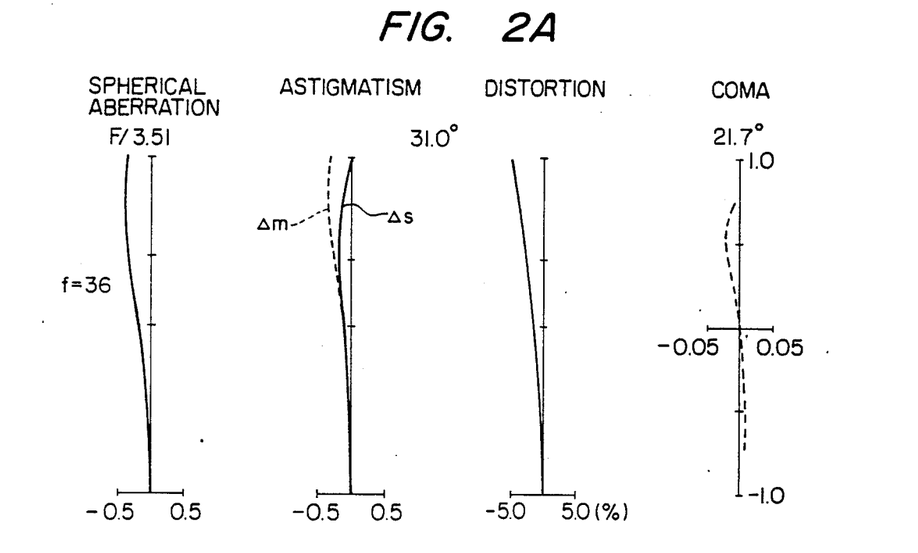
FIGS. 2A, 2B and 2C respectively show graphs illustrating aberration curves of Embodiment 1 of the present invention.
Figure 2B:
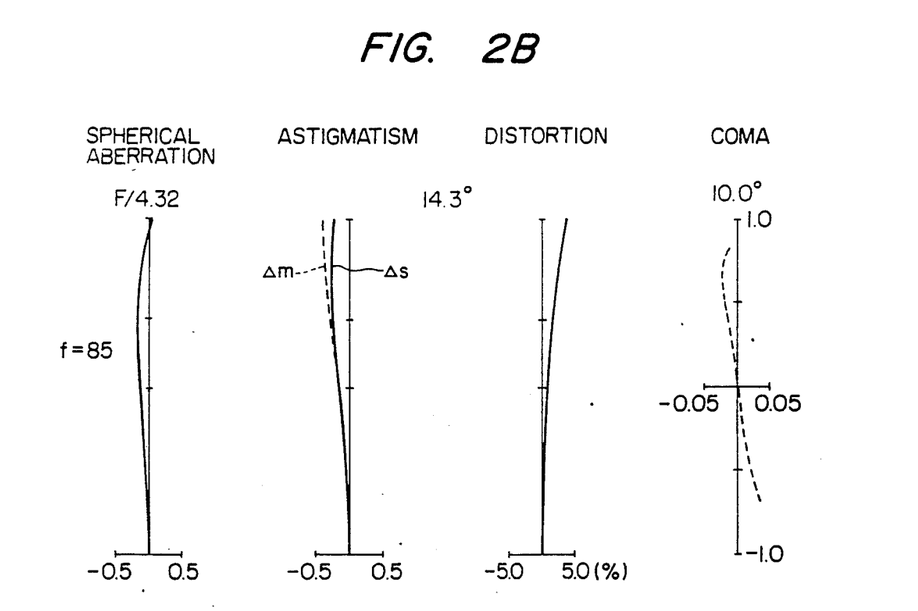
Figure 2C:
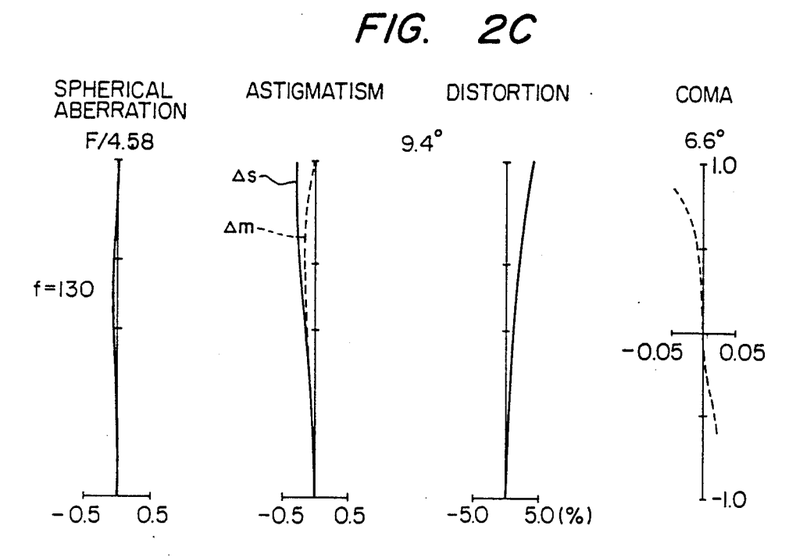

Graphs of aberration curves of Embodiment 1 are as shown in FIGS. 2A, 2B and 2C in which FIG. 2A shows aberration curves when f=36, FIG. 2B shows aberration curves when f=85, and FIG. 2C shows aberration curves when f=130.

Figure 3A:
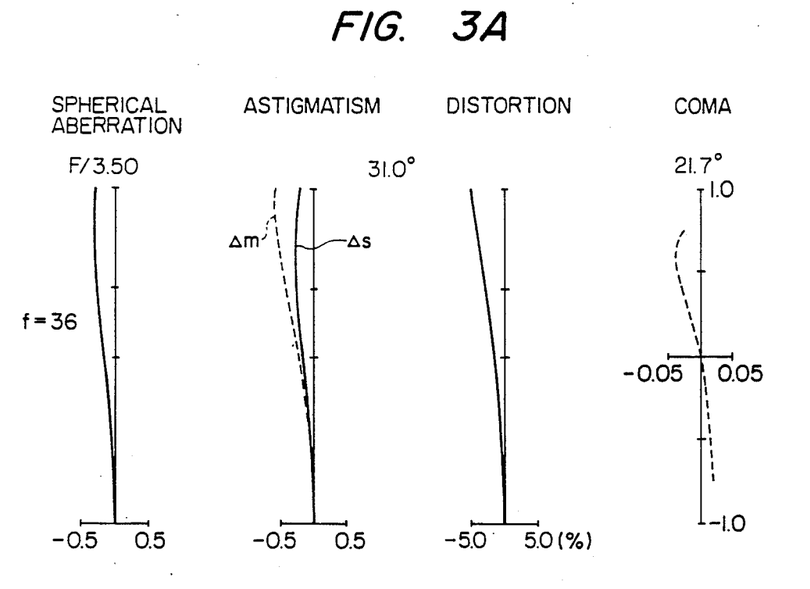
FIGS. 3A, 3B and 3C respectively show graphs illustrating aberration curves of Embodiment 2 of the present invention.
Figure 3B:
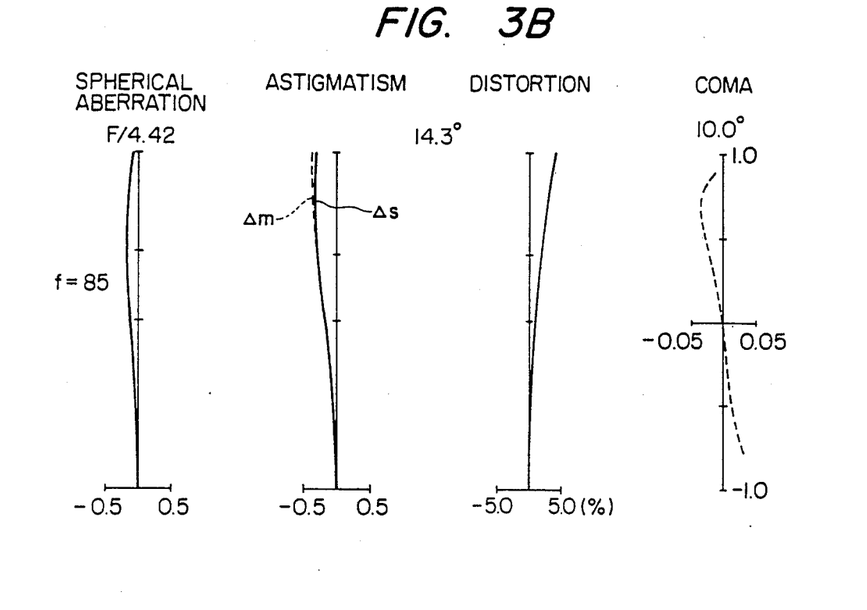
Figure 3C:
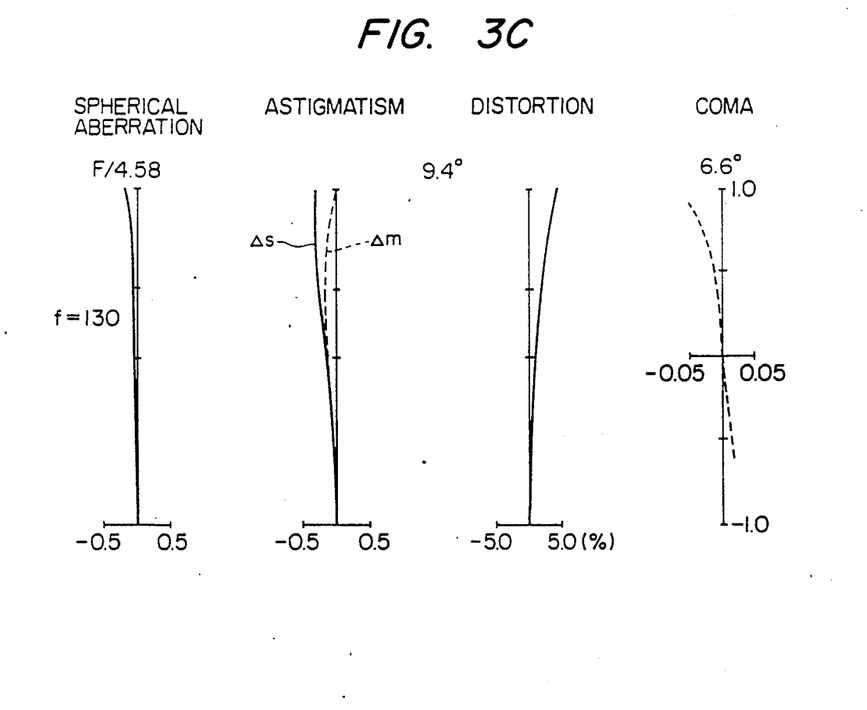

Graphs of aberration curves of Embodiment 2 are as shown in FIGS. 3A, 3B and 3C in which FIG. 3A shows aberration curves when f=36, FIG. 3B shows aberration curves when f=85, and FIG. 3C shows aberration curves when f=130.

Figure 4A:
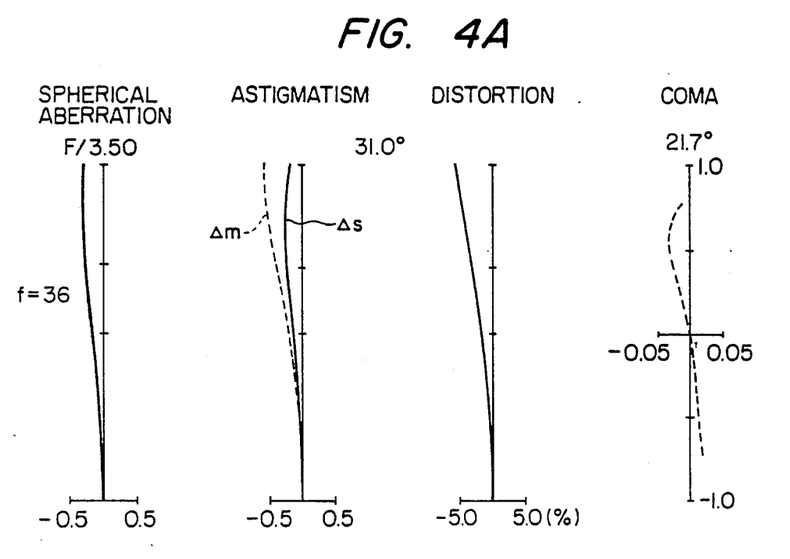
FIGS. 4A, 4B and 4C respectively show graphs illustrating aberration curves of Embodiment 3 of the present invention.
Figure 4B:
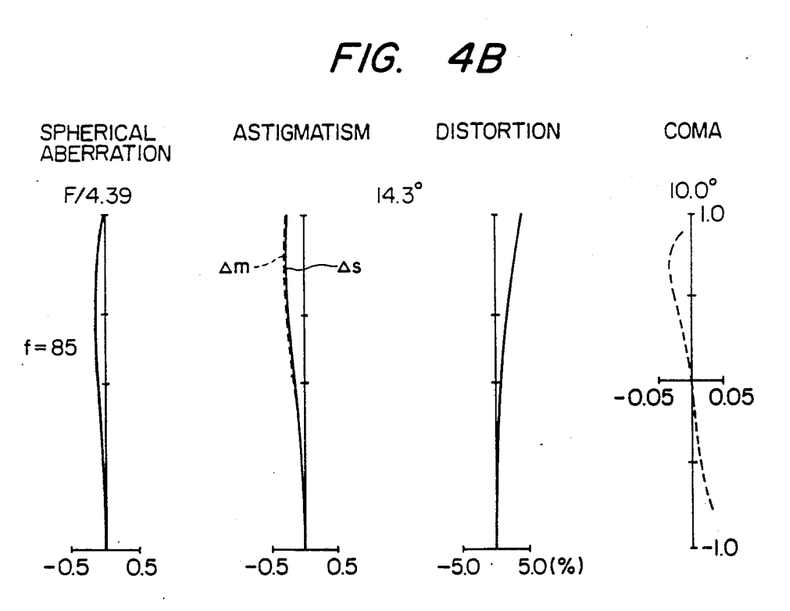
Figure 4C:
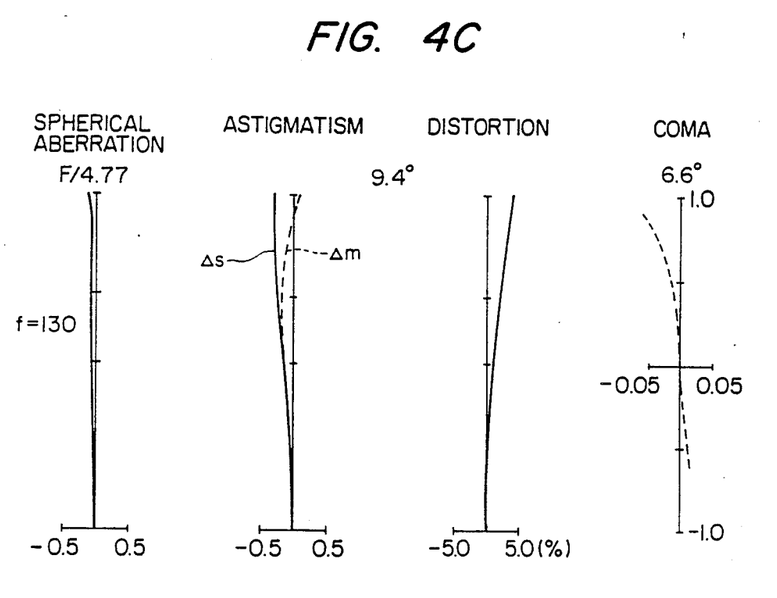

Graphs of aberration curves of Embodiment 3 are as shown in FIGS. 4A, 4B and 4C in which FIG. 4A shows aberration curves when f=36, FIG. 4B shows aberration curves when f=85, and FIG. 4C shows aberration curves when f=130.

As described in detail so far and as it is evident from respective embodiments, the present invention provides a zoom lens system which is arranged that the zoom ratio is large, i.e., the smallest field angle is smaller than 19° and the largest field angle is larger than 60°, the largest aperture ratio is F/3.5, and the aperture ratio in the teleposition is F/4.68, and arranged that aberrations are corrected favourably and, at the same time, which is arranged compactly, i.e., the overall length of the lens system is short and the outer diameter of the lens system is small. Besides, for the zoom lens system according to the present invention, it is possible to arranged that the second lens group is kept fixed in respect to the image surface irrespectively of the variation of the focal length of the lens system. When so arranged, the number of factors such as eccentricity etc. that make the imaging performance unfavourable becomes small. Therefore, the optical performance becomes stable and it is possible to make the structure of lens mount simple.

We claim:

1. A zoom lens system comprising a first lens group having positive refractive power and having a focusing function, a second lens group having negative refractive power and having a vari-focal function, a third lens group having positive refractive power and having a vari-focal function, and a fourth lens group having positive refractive power and having a vari-focal function, wherein said second lens group comprises, in the order from the object side, a negative lens having a surface with strong curvature on the image side, a cemented doublet consisting of a negative lens and positive lens, a negative lens having a surface with strong curvature on the object side, and a positive meniscus lens having a surface with strong curvature on the object side, said zoom lens system fulfilling the conditions (1) through (4) shown below:

(1) $1.6 < f_1/f_W < 2.0$ (2) $0.4 < |f_2|/f_W < 0.6$ (3) $2.1 < \beta_{2T}/\beta_{2W} < 2.4$ (4) $1.5 < \beta_{3T}\beta_{4T}/\beta_{3W}\beta_{4W} < 1.7$ where, reference symbol $f_W$ represents the focal length of the lens system as a whole in the wide position, reference symbols $f_1$ and $f_2$ respectively represent focal lengths of the first and second lens groups, reference symbol $\beta_{2T}$ represents the magnification of the second lens group in the teleposition, reference symbol $\beta_{2W}$ represents the magnification of the second lens group in the wide position, reference symbol $\beta_{3T}$ represents the magnification of the third lens group in the teleposition, reference symbol $\beta_{3W}$ represents the magnification of the third lens group in the wide position, reference symbol $\beta_{4T}$ represents the magnification of the fourth lens group in the teleposition, and reference symbol $\beta_{4W}$ represents the magnification of the fourth lens group in the wide position.

2. A zoom lens system according to claim 1 further fulfilling the conditions (5) through (8) shown below:

(5) $1 < r_{2-2}/-f_2 < 1.1$ (6) $12 < r_{2-3}/f_2 < 22$ (7) $0.48 < r_{2-8}/r_{2-9} < 0.58$ (8) $\nu_{2-2} - \nu_{2-3} > 15$ where, reference symbol $r_{2-2}$ represents the radius of curvature of the second surface in the second lens group, reference symbol $r_{2-3}$ represents the radius of curvature of the third surface in the second lens group, reference symbol $r_{2-8}$ represents the radius of curvature of the eighth surface in the second lens group, reference symbol $r_{2-9}$ represents the radius of cruvature of the ninth surface in the second lens group, reference symbol $\nu_{2-2}$ represents Abbe's number of the second lens in the second lens group, and reference symbol $\nu_{2-3}$ represents Abbe's number of the third lens in the second lens group.

3. A zoom lens system according to claim 2 wherein said first lens group comprises a cemented doublet, which consists of a negative lens and a positive lens, and a positive lens, said third lens group comprises a positive lens, a positive lens, and a negative lens, and said fourth lens group comprises a positive lens, a negative lens, a positive lens, and a positive lens, said zoom lens system having the following numerical data:

| $f = 36 \sim 85 \sim 130$ | | | |
|---|---|---|---|
| $r_1 = 139.9220$ | | | |
| $d_1 = 2.3000$ | | $n_1 = 1.80518$ | $\nu_1 = 25.43$ |
| $r_2 = 45.3700$ | | | |
| $d_2 = 7.1000$ | | $n_2 = 1.54771$ | $\nu_2 = 62.83$ |
| $r_3 = -519.0230$ | | | |
| $d_3 = 0.1000$ | | | |
| $r_4 = 46.2310$ | | | |
| $d_4 = 4.7000$ | | $n_3 = 1.78800$ | $\nu_3 = 47.38$ |
| $r_5 = 310.0150$ | | | |
| $d_5 = D_1$ | | | |
| $r_6 = -900.8200$ | | | |
| $d_6 = 1.1000$ | | $n_4 = 1.72916$ | $\nu_4 = 54.68$ |
| $r_7 = 17.6420$ | | | |
| $d_7 = 4.8300$ | | | |
| $r_8 = -244.7750$ | | | |
| $d_8 = 1.1000$ | | $n_5 = 1.77250$ | $\nu_5 = 49.66$ |
| $r_9 = 28.0590$ | | | |
| $d_9 = 3.2600$ | | $n_6 = 1.80518$ | $\nu_6 = 25.43$ |
| $r_{10} = 453.8410$ | | | |
| $d_{10} = 1.5300$ | | | |
| $r_{11} = -44.1060$ | | | |
| $d_{11} = 1.0000$ | | $n_7 = 1.72916$ | $\nu_7 = 54.68$ |
| $r_{12} = 221.4440$ | | | |
| $d_{12} = 0.1000$ | | | |
| $r_{13} = 36.5760$ | | | |
| $d_{13} = 1.8900$ | | $n_8 = 1.84666$ | $\nu_8 = 23.78$ |
| $r_{14} = 69.4260$ | | | |
| $d_{14} = D_2$ | | | |
| $r_{15} = 37.3020$ | | | |
| $d_{15} = 4.3000$ | | $n_9 = 1.55963$ | $\nu_9 = 61.17$ |
| $r_{16} = -45.0030$ | | | |
| $d_{16} = 0.1000$ | | | |
| $r_{17} = 41.3560$ | | | |
| $d_{17} = 3.0100$ | | $n_{10} = 1.53172$ | $\nu_{10} = 48.90$ |
| $r_{18} = -212.4540$ | | | |
| $d_{18} = 2.3100$ | | | |
| $r_{19} = -37.0760$ | | | |
| $d_{19} = 1.3900$ | | $n_{11} = 1.80518$ | $\nu_{11} = 25.43$ |
| $r_{20} = 778.4640$ | | | |
| $d_{20} = D_3$ | | | |
| $r_{21} = 39.7800$ | | | |
| $d_{21} = 8.2100$ | | $n_{12} = 1.55963$ | $\nu_{12} = 61.17$ |
| $r_{22} = -36.5970$ | | | |
| $d_{22} = 5.0600$ | | | |
| $r_{23} = -24.3140$ | | | |
| $d_{23} = 1.0000$ | | $n_{13} = 1.80440$ | $\nu_{13} = 39.58$ |
| $r_{24} = 41.6540$ | | | |
| $d_{24} = 2.4000$ | | | |
| $r_{25} = -114.3040$ | | | |
| $d_{25} = 3.4600$ | | $n_{14} = 1.57501$ | $\nu_{14} = 41.49$ |
| $r_{26} = -28.0590$ | | | |
| $d_{26} = 0.1000$ | | | |
| $r_{27} = 63.4780$ | | | |
| $d_{27} = 3.6800$ | | $n_{15} = 1.51633$ | $\nu_{15} = 64.15$ |
| $r_{28} = -69.6940$ | | | |
| f | 36 | 85 | 130 |
| $D_1$ | 1.500 | 17.510 | 23.800 |
| $D_2$ | 19.710 | 7.180 | 0.800 |
| $D_3$ | 8.990 | 2.790 | 1.650 |
| $f_1/f_W = 1.76$, $f_2/f_W = -0.466$ | | | |
| $\beta_{2T}/\beta_{2W} = 2.296$, $\beta_{3T}\beta_{4T}/\beta_{3W}\beta_{4W} = 1.565$ | | | |
| $|\nu_{2-2} - \nu_{2-3}| = 23.57$, $r_{2-2}/-f_2 = 1.045$ | | | |
| $r_{2-3}/f_2 = 14.506$, $r_{2-8}/r_{2-9} = 0.527$ | | | | where, reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbol f represents the focal length of the lens system as a whole.

4. A zoom lens system according to claim 2 wherein said first lens group comprises a cemented doublet, which consists of a negative lens and a positive lens, and a positive lens, said third lens group comprises a positive lens, a positive lens, and a negative lens, and said fourth lens group comprises a positive lens, a negative lens, a positive lens, and a positive lens, said zoom lens system having the following numerical data:

| $f = 36 \sim 85 \sim 130$ | | | |
|---|---|---|---|
| $r_1 = 154.8968$ | | | |
| $d_1 = 2.3000$ | | $n_1 = 1.80518$ | $\nu_1 = 25.43$ |
| $r_2 = 45.3135$ | | | |
| $d_2 = 7.1001$ | | $n_2 = 1.54771$ | $\nu_2 = 62.83$ |
| $r_3 = -381.2565$ | | | |
| $d_3 = 0.1000$ | | | |
| $r_4 = 46.6902$ | | | |
| $d_4 = 4.5998$ | | $n_3 = 1.78800$ | $\nu_3 = 47.38$ |
| $r_5 = 363.8236$ | | | |
| $d_5 = D_1$ | | | |

$f = 36 \sim 85 \sim 130$

| | | |
|---|---|---|
| $r_6 = -693.0691$ | | |
| $d_6 = 1.1000$ | $n_4 = 1.72916$ | $\nu_4 = 54.68$ |
| $r_7 = 18.0061$ | | |
| $d_7 = 4.7005$ | | |
| $r_8 = -330.8092$ | | |
| $d_8 = 1.1000$ | $n_5 = 1.77250$ | $\nu_5 = 49.66$ |
| $r_9 = 25.9091$ | | |
| $d_9 = 3.3900$ | $n_6 = 1.80518$ | $\nu_6 = 25.43$ |
| $r_{10} = 574.5947$ | | |
| $d_{10} = 1.5302$ | | |
| $r_{11} = -43.2765$ | | |
| $d_{11} = 1.0000$ | $n_7 = 1.72916$ | $\nu_7 = 54.68$ |
| $r_{12} = 185.5786$ | | |
| $d_{12} = 0.1000$ | | |
| $r_{13} = 36.8904$ | | |
| $d_{13} = 1.8900$ | $n_8 = 1.84666$ | $\nu_8 = 23.78$ |
| $r_{14} = 70.9466$ | | |
| $d_{14} = D_2$ | | |
| $r_{15} = 38.3037$ | | |
| $d_{15} = 4.3000$ | $n_9 = 1.55963$ | $\nu_9 = 61.17$ |
| $r_{16} = -42.3613$ | | |
| $d_{16} = 0.1000$ | | |
| $r_{17} = 41.0704$ | | |
| $d_{17} = 3.0405$ | $n_{10} = 1.53172$ | $\nu_{10} = 48.90$ |
| $r_{18} = -487.5034$ | | |
| $d_{18} = 2.1065$ | | |
| $r_{19} = -36.8331$ | | |
| $d_{19} = 1.4188$ | $n_{11} = 1.80518$ | $\nu_{11} = 25.43$ |
| $r_{20} = 482.0025$ | | |
| $d_{20} = D_3$ | | |
| $r_{21} = 36.8102$ | | |
| $d_{21} = 8.3360$ | $n_{12} = 1.55963$ | $\nu_{12} = 61.17$ |
| $r_{22} = -36.2265$ | | |
| $d_{22} = 5.0639$ | | |
| $r_{23} = -24.6299$ | | |
| $d_{23} = 1.0000$ | $n_{13} = 1.80440$ | $\nu_{13} = 39.58$ |
| $r_{24} = 41.1204$ | | |
| $d_{24} = 2.4000$ | | |
| $r_{25} = -208.0241$ | | |
| $d_{25} = 3.2891$ | $n_{14} = 1.57501$ | $\nu_{14} = 41.49$ |
| $r_{26} = -29.3027$ | | |
| $d_{26} = 0.1000$ | | |
| $r_{27} = 71.3475$ | | |
| $d_{27} = 3.4825$ | $n_{15} = 1.51633$ | $\nu_{15} = 64.15$ |
| $r_{28} = -74.5180$ | | |

| f | 36 | 85 | 130 |
|---|---|---|---|
| $D_1$ | 1.5 | 17.26 | 23.51 |
| $D_2$ | 20.19 | 7.36 | 0.8 |
| $D_3$ | 10.56 | 4.91 | 3.92 |

$f_1/f_W = 1.76$, $f_2/f_W = 0.475$
$\beta_{2T}/\beta_{2W} = 2.276$, $\beta_{3T}\beta_{4T}/\beta_{3W}\beta_{4W} = 1.582$
$|\nu_{2-2} - \nu_{2-3}| = 23.57$, $r_{2-2}/-f_2 = 1.0477$
$r_{2-3}/f_2 = 19.249$, $r_{2-8}/r_{2-9} = 0.512$ where, reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbol f represents the focal length of the lens system as a whole.

5. A zoom lens system according to claim 2 wherein said first lens group comprises a cemented doublet, which consists of a negative lens and a positive lens, and a positive lens, said third lens group comprises a positive lens, a positive lens, and a negative lens, and said fourth lens group comprises a positive lens, a negative lens, a positive lens, and a positive lens, said zoom lens system having the following numerical data:

$f = 36 \sim 85 \sim 130$

| | | |
|---|---|---|
| $r_1 = 181.2737$ | | |
| $d_1 = 2.3100$ | $n_1 = 1.80518$ | $\nu_1 = 25.43$ |
| $r_2 = 45.4961$ | | |
| $d_2 = 7.0500$ | $n_2 = 1.54771$ | $\nu_2 = 62.83$ |
| $r_3 = -369.7884$ | | |
| $d_3 = 0.1000$ | | |
| $r_4 = 47.6507$ | | |
| $d_4 = 4.5900$ | $n_3 = 1.78590$ | $\nu_3 = 44.18$ |
| $r_5 = 423.1766$ | | |
| $d_5 = D_1$ | | |
| $r_6 = -829.0248$ | | |
| $d_6 = 1.3500$ | $n_4 = 1.72916$ | $\nu_4 = 54.68$ |
| $r_7 = 18.2024$ | | |
| $d_7 = 4.4501$ | | |
| $r_8 = -315.9500$ | | |
| $d_8 = 1.1000$ | $n_5 = 1.77250$ | $\nu_5 = 49.66$ |
| $r_9 = 26.6380$ | | |
| $d_9 = 3.3900$ | $n_6 = 1.80518$ | $\nu_6 = 25.43$ |
| $r_{10} = 1025.3081$ | | |
| $d_{10} = 1.5294$ | | |
| $r_{11} = -44.4509$ | | |
| $d_{11} = 1.0000$ | $n_7 = 1.72916$ | $\nu_7 = 54.68$ |
| $r_{12} = 230.7650$ | | |
| $d_{12} = 0.1000$ | | |
| $r_{13} = 36.3410$ | | |
| $d_{13} = 1.8900$ | $n_8 = 1.84666$ | $\nu_8 = 23.78$ |
| $r_{14} = 66.4838$ | | |
| $d_{14} = D_2$ | | |
| $r_{15} = 40.0740$ | | |
| $d_{15} = 4.4210$ | $n_9 = 1.58913$ | $\nu_9 = 60.97$ |
| $r_{16} = -43.6958$ | | |
| $d_{16} = 0.1000$ | | |
| $r_{17} = 41.0508$ | | |
| $d_{17} = 3.1550$ | $n_{10} = 1.53172$ | $\nu_{10} = 48.90$ |
| $r_{18} = 461.7770$ | | |
| $d_{18} = 2.1713$ | | |
| $r_{19} = -37.0252$ | | |
| $d_{19} = 1.0000$ | $n_{11} = 1.80518$ | $\nu_{11} = 25.43$ |
| $r_{20} = 496.1940$ | | |
| $d_{20} = D_3$ | | |
| $r_{21} = 37.7635$ | | |
| $d_{21} = 8.5087$ | $n_{12} = 1.58913$ | $\nu_{12} = 60.97$ |
| $r_{22} = -37.7635$ | | |
| $d_{22} = 5.1047$ | | |
| $r_{23} = -25.3960$ | | |
| $d_{23} = 1.0000$ | $n_{13} = 1.80440$ | $\nu_{13} = 39.58$ |
| $r_{24} = 41.2554$ | | |
| $d_{24} = 2.1326$ | | |
| $r_{25} = -242.2221$ | | |
| $d_{25} = 3.2000$ | $n_{14} = 1.57501$ | $\nu_{14} = 41.49$ |
| $r_{26} = -28.4950$ | | |
| $d_{26} = 0.1000$ | | |
| $r_{27} = 66.8990$ | | |
| $d_{27} = 3.4825$ | $n_{15} = 1.51821$ | $\nu_{15} = 65.04$ |
| $r_{28} = -95.2570$ | | |

| f | 36 | 85 | 130 |
|---|---|---|---|
| $D_1$ | 1.50 | 17.859 | 24.61 |
| $D_2$ | 20.51 | 7.370 | 0.80 |
| $D_3$ | 10.67 | 4.946 | 3.90 |

$f_1/f_W = 1.84$, $f_2/f_W = -0.495$
$\beta_{2T}/\beta_{2W} = 2.23$, $\beta_{3T}\beta_{4T}/\beta_{3W}\beta_{4W} = 1.590$
$|\nu_{2-2} - \nu_{2-3}| = 24.23$, $r_{2-2}/-f_2 = 1.0143$
$r_{2-3}/f_2 = 17.55$, $r_{2-8}/r_{2-9} = 0.547$ where, reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbol f represents the focal length of the lens system as a whole.

* * * * *